(12) United States Patent
Eberlein

(10) Patent No.: US 11,167,781 B2
(45) Date of Patent: Nov. 9, 2021

(54) SHOPPING TROLLEY THAT CAN BE NESTED WITH IDENTICAL TROLLEYS

(71) Applicant: Martin Eberlein, Kammeltal (DE)

(72) Inventor: Martin Eberlein, Kammeltal (DE)

( * ) Notice: Subject to any disclaimer, the term of this patent is extended or adjusted under 35 U.S.C. 154(b) by 11 days.

(21) Appl. No.: 16/641,916

(22) PCT Filed: Aug. 24, 2018

(86) PCT No.: PCT/DE2018/000250
§ 371 (c)(1),
(2) Date: Feb. 25, 2020

(87) PCT Pub. No.: WO2019/042489
PCT Pub. Date: Mar. 7, 2019

(65) Prior Publication Data
US 2020/0247448 A1   Aug. 6, 2020

(30) Foreign Application Priority Data
Aug. 29, 2017  (DE) ..................... 20 2017 004 527.3

(51) Int. Cl.
*B62B 3/02*   (2006.01)
*B62B 3/14*   (2006.01)

(52) U.S. Cl.
CPC .............. *B62B 3/1444* (2013.01); *B62B 3/02* (2013.01); *B62B 2501/067* (2013.01)

(58) Field of Classification Search
CPC ......... B62B 3/14; B62B 3/144; B62B 3/1444; B62B 5/08; B62B 5/082
See application file for complete search history.

(56) References Cited

U.S. PATENT DOCUMENTS

| | | | | |
|---|---|---|---|---|
| 2,890,057 A | * | 6/1959 | Davis ..................... | B62B 3/144 |
| | | | | 280/33.993 |
| 2,964,326 A | * | 12/1960 | Schray ................... | B62B 3/144 |
| | | | | 280/33.993 |

(Continued)

FOREIGN PATENT DOCUMENTS

| | | |
|---|---|---|
| DE | 102010045455 A1 | 3/2012 |
| DE | 202014006501 U1 | 8/2015 |
| WO | WO-2012034556 A2 | 3/2012 |

OTHER PUBLICATIONS

International Search Report (in English and German) and Written Opinion of the ISA (in German) issued in PCT/DE2018/000250, dated Jan. 28, 2019; ISA/EP.

*Primary Examiner* — Jeffrey J Restifo
(74) *Attorney, Agent, or Firm* — Harness, Dickey & Pierce, P.L.C.

(57) ABSTRACT

The invention relates to a nestable shopping trolley comprising a foldable child-seat assembly having: a backrest movably mounted on the rear wall of the basket; and a cover arrangement which is pivotally provided on the rear wall, which rests on a seat arrangement and which, when pivoted upwards, closes leg-holes in the rear wall. When the child-seat assembly is not in use, the rear wall, the seat arrangement and the cover arrangement lie tightly against one another with the seat arrangement hanging downwards and the cover arrangement pointing upwards. The cover arrangement has two projecting parts pointing outwards in opposite directions and the backrest has a central section and two sliding sections laterally bordering the central section, the projecting parts sliding along the sliding sections of the backrest and said sliding sections forming respective spaces that are occupied by the projecting parts when the child-seat assembly is not in use.

7 Claims, 2 Drawing Sheets

(56) References Cited

U.S. PATENT DOCUMENTS

Figure 1:
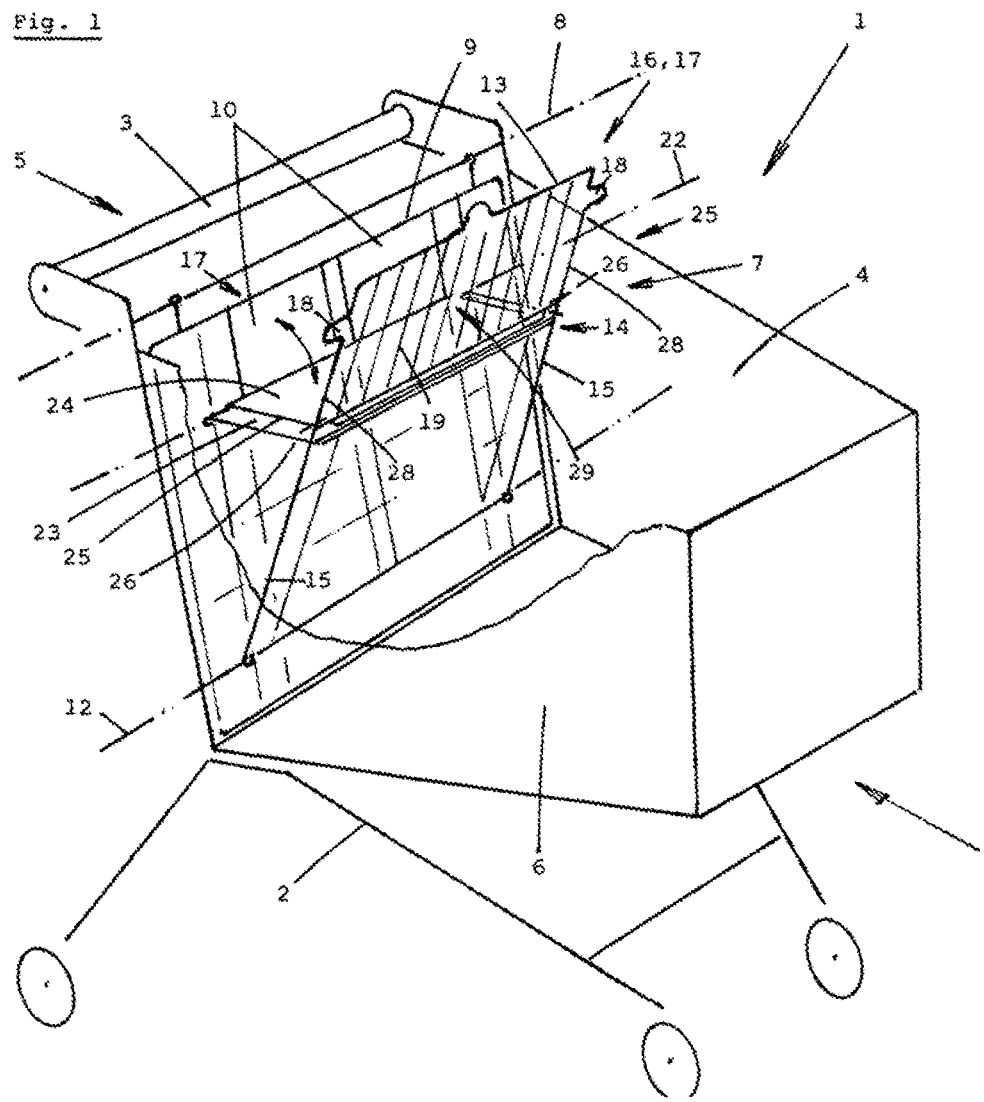

| Patent No. | | Date | Inventor | Classification |
|---|---|---|---|---|
| 2,998,978 A | * | 9/1961 | Sides | B62B 3/144 280/33.993 |
| 3,093,385 A | * | 6/1963 | Thompson | B62B 3/144 280/33.993 |
| 3,157,410 A | * | 11/1964 | Hummer | B62B 3/144 280/33.993 |
| 3,168,327 A | * | 2/1965 | Lachance | B62B 3/144 280/33.993 |
| 3,306,661 A | * | 2/1967 | Allen | B62B 3/144 297/474 |
| 3,375,018 A | * | 3/1968 | Close | B62B 3/12 280/33.991 |
| 3,497,234 A | * | 2/1970 | Schray | B62B 3/144 280/33.993 |
| 3,963,255 A | * | 6/1976 | Trubiano | B62B 3/144 280/33.993 |
| 4,065,142 A | * | 12/1977 | Rehrig | B62B 3/144 280/33.993 |
| 4,176,849 A | * | 12/1979 | Rehrig | B62B 3/144 280/33.993 |
| 4,742,943 A | * | 5/1988 | Trubiano | B62B 3/1428 224/277 |
| 5,020,811 A | * | 6/1991 | Ondrasik | B62B 3/144 280/33.993 |
| 5,348,323 A | * | 9/1994 | Trubiano | B62B 3/144 280/33.993 |
| 5,368,318 A | * | 11/1994 | Rehrig | B62B 3/144 16/267 |
| 5,505,472 A | * | 4/1996 | Trubiano | B62B 3/144 280/33.993 |
| 5,630,599 A | * | 5/1997 | Adamson | B62B 3/144 280/33.993 |
| 6,364,325 B1 | * | 4/2002 | Chalfant | B62B 3/144 280/33.993 |
| 6,832,768 B2 | * | 12/2004 | Duchene | B62B 3/144 280/33.991 |
| 7,063,337 B2 | * | 6/2006 | Russell | B62B 3/144 280/33.992 |
| 7,237,782 B2 | * | 7/2007 | Tucker | B62B 3/144 280/33.991 |
| 7,837,205 B2 | * | 11/2010 | Simard | B62B 3/144 280/33.993 |
| 8,002,290 B2 | * | 8/2011 | Russell | B62B 3/144 280/33.993 |
| D658,841 S | * | 5/2012 | Walter | D34/27 |
| D660,542 S | * | 5/2012 | Walter | D34/27 |
| 8,985,597 B2 | * | 3/2015 | Eberlein | B62B 5/082 280/33.993 |
| 8,991,836 B2 | * | 3/2015 | Walter | B62B 3/144 280/33.993 |
| 9,302,692 B2 | | 4/2016 | Smith | B62B 3/14 |
| 2005/0151333 A1 | * | 7/2005 | Russell | B62B 3/144 280/33.993 |
| 2008/0100010 A1 | * | 5/2008 | Russell | B62B 3/144 280/33.993 |
| 2011/0062675 A1 | * | 3/2011 | Brown | B62B 3/144 280/33.993 |
| 2011/0304111 A1 | * | 12/2011 | Russell | B62B 3/144 280/33.993 |
| 2013/0168932 A1 | | 7/2013 | Eberlein | |

* cited by examiner

SHOPPING TROLLEY THAT CAN BE NESTED WITH IDENTICAL TROLLEYS

CROSS-REFERENCE TO RELATED APPLICATIONS

This application is a 371 U.S. National Phase of International Application No. PCT/DE2018/000250, filed Aug. 24, 2018, which claims the benefit of German Patent Application No. 20 2017 004 527.3, filed Aug. 29, 2017. The entire disclosures of the above applications are incorporated herein by reference.

FIELD

The invention relates to a shopping cart that can be nested with identical carts, and, more particularly, to a shopping cart having a child seat that is foldable in a space-saving manner.

BACKGROUND

Shopping carts with a dual-purpose child seat arrangement are used in self-service stores.

SUMMARY

The invention relates to a shopping cart that can be nested with identical carts, with a basket for holding goods, with a foldable child seat arrangement which is intended for closing the rearward open region of the basket and can be moved into the basket interior and back again, wherein the child seat arrangement has a rear wall equipped with two leg holes, a backrest mounted movably on the rear wall and a seat device which can be used as seating for a small child in the use position of the child seat arrangement and is intended for limiting the pivoting range of the backrest, wherein the child seat arrangement is equipped with a cover device which is arranged pivotably on the rear wall, rests on the seat device and can be pivoted upward and back again in order to close the leg holes in the upwardly pivoted position and, likewise in this position, to form, together with the seat device, the rear wall and the backrest, a further device for depositing goods, and wherein, in the non-use position, that is to say in the folded state of the child seat arrangement, the rear wall, the seat device and the cover device are in close contact with one another, the seat device hangs downward and the cover device is directed upward.

It is an object of the invention to further develop a shopping cart such that the child seat arrangement thereof, equipped with an additional cover device, can likewise be folded in a space-saving manner.

The object is achieved as described in the characterizing part of claim 1.

The proposed solution advantageously avoids the situation in which the thickness of the protrusions contributes to an increase in the thickness of the folded child seat arrangement. A child seat arrangement formed and folded in such a way can thus be based on such solutions as are proposed in WO 2012/034556 A2.

DRAWING DESCRIPTION

Figure 2:
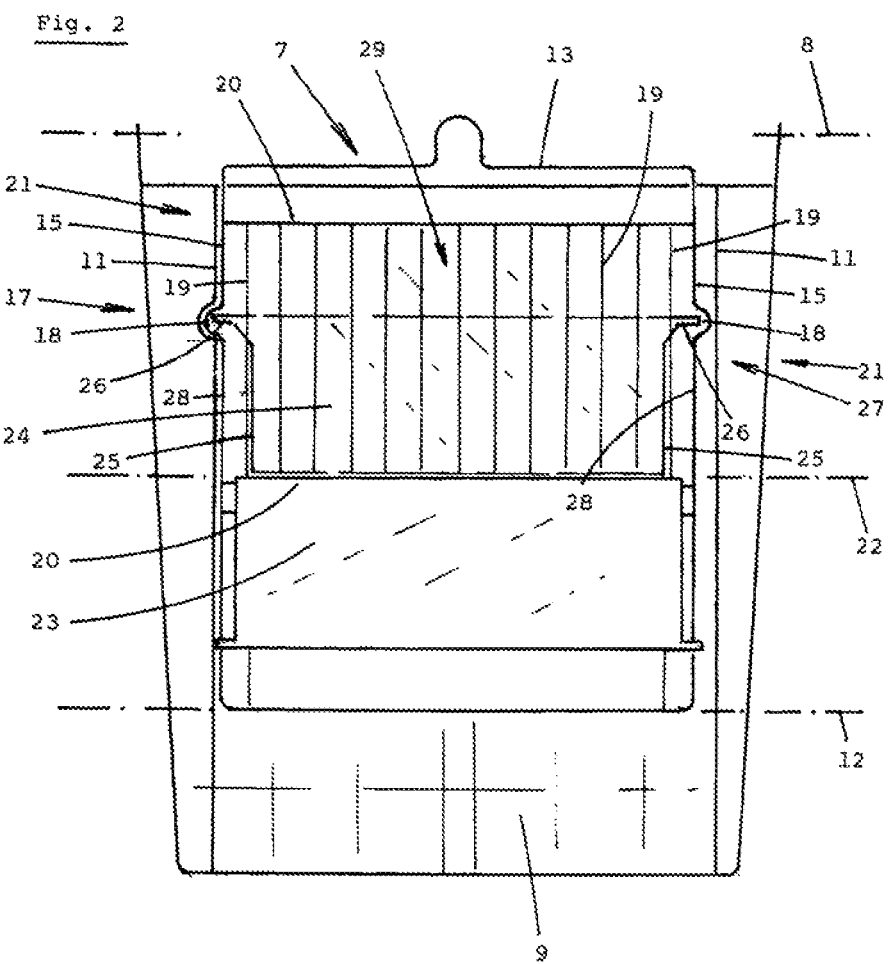

The invention is explained in more detail on the basis of an exemplary embodiment. In the drawing:

FIG. 1 shows a shopping cart with a child seat device in the use position, and FIG. 2 shows the same child seat device in the non-use position and viewed in the longitudinal direction of the shopping cart.

DETAILED DESCRIPTION

The shopping cart 1 illustrated in three dimensions in FIG. 1 has an undercarriage 2, a basket 4 arranged on the undercarriage and, at the rear side, a pushing device 3. That region 5 of the basket 4 which is rearwardly open in a known manner is closed by a pivotable child seat arrangement 7, which can be pivoted into the basket interior for the purpose of nesting with identical shopping carts 1 in a space-saving manner. That side wall 6 of the basket 4 which is facing the viewer of the image is shown in a somewhat cut-away manner in the drawing in order to be able to show the child seat arrangement 7 better. The child seat arrangement 7 is formed by a rear wall 9, a backrest 13, a seat device 23 and a cover device 24. The rear wall 9 is mounted on the basket 4 pivotably about an upper first horizontal axis 8, the backrest 13 is mounted on the rear wall 9 pivotably about a lower second horizontal axis 12 and the seat device 23 and the cover device 24 are mounted on the rear wall 9 pivotably about a third horizontal axis 22 which is above the second horizontal axis 12 and below the first horizontal axis 8. The seat device 23 is supported on a clearance 14 located at the backrest 13 in a slidingly movable manner such that the seat device 23 hangs downward in the non-use position of the child seat arrangement 7 in a known manner, see FIG. 2. The cover device 24 bears on the seat device 23, as illustrated in the drawing, and in this position can be used together with the seat device 23 as a seat base. The rear wall 9 has two leg holes 10 for the legs of a small child sitting down on the seat device 23 or the seat base. The arcuate double-headed arrow depicted on the cover device 24 indicates that the cover device 24 can be moved upward toward the rear wall 9 and back again in order to close the two leg holes 10 in the upwardly pivoted position if it is necessary to use the seat device 23 not as seating but rather as an additional location for depositing goods, e.g. for depositing pressure-sensitive goods. The cover device 24 has a protrusion 26 at each of its two sides 25 that run in the longitudinal direction of the shopping cart 1 and spaced apart from the third horizontal axis 22, wherein the protrusions 26 extend outwardly in opposite directions and each protrusion 26 bears against a sliding portion 28 of the backrest 13 which in the embodiment shown in FIG. 1 is formed by a vertical rod 15. In a predetermined spatial region 17 located in each case in the top region 16 of the backrest 13, each vertical rod 15 is shaped in a manner diverging from its vertical direction such that a space 18 is formed laterally on each vertical rod 15. In the example, the spaces 18 are directed laterally outward and thus arranged in a mirror-inverted manner. The significance of the spaces 18 is illustrated in more detail in FIG. 2. The drawing dispenses with a detailed illustration of further vertical, horizontal or other rods forming the rear wall 9 and the backrest 13, since inclusion of these rods would make the drawing unclear. A greater or smaller number of rods may be present and rods and the intermediate spaces thereof may also be replaced by closed surfaces. The seat device 23 not only serves as a seat but also defines the pivoting range of the backrest 13 in a known manner by means of stops which engage behind said seat device. In turn, the arrow depicted shows the longitudinal direction of the shopping cart 1. If the child seat arrangement 7 is brought into the use position or into the non-use position by moving the backrest 13, the protrusions 26 of the cover device 24 slide on and along the sliding portions 28, in the drawing on the vertical rods 15 of the backrest 13.

As an alternative to the embodiment illustrated in the drawing, the stops of the seat device 23 which define the pivoting range of the backrest 13 and engage behind said seat device may also be arranged centrally, as is known from DE 20 2014 006 501 U1. At least one stop is required.

Looking toward the rear side of the backrest 13, and hence looking from the front of the basket to the pushing device 3, FIG. 2 shows the child seat device 7 viewed in the longitudinal direction of the shopping cart 1. In this illustration as well, certain horizontal and vertical rods of the rear wall 9 and of the backrest 13 are omitted in order to achieve a clear illustration of the child seat arrangement. At the top, the first horizontal axis 8 is depicted, about which the rear wall 9 can move on the basket 4 in a known manner. Also illustrated is the second horizontal axis 12, which makes possible the known moving of the backrest 13, and the third horizontal axis 22, which is likewise depicted, allows the seat device 23 and the cover device 24 to move. The child seat device 7 is illustrated in the non-use position, in which all parts of the child seat arrangement 7 are in close contact with one another. That is to say, the child seat arrangement 7 is in the folded state, in which the seat device 23 hangs downward and the cover device 24 is directed upward. The backrest 13 has a number of vertical support rods 19 situated above the seat device 23 and forming, in a known manner, an arrangement against which the back of the small child can lean. The support rods 19 are located in a first spatial region, which, when the drawing is viewed, is arranged closest to the viewer of the image. The support rods 19 are connected in a known manner to two transverse rods 20 which are located in a second spatial region reaching deeper into the image plane and therefore further away from the viewer of the image than the first spatial region. The two transverse rods 20 are in turn connected to the two vertical rods 15 of the backrest 13, wherein, in the example, the two vertical rods 15 form the two outer sides 21 of the backrest 13. The two vertical rods 15 are located in a third spatial region penetrating even deeper into the image plane and therefore yet further away from the viewer of the image. One of the protrusions 26 is preferably provided respectively at the top end 27 of the cover device 24, in any case arranged at both sides 25 of the cover device 24, wherein each protrusion 26 is arranged in a mirror-inverted manner with respect to the other protrusion 26 and is directed outward to the right and left. At the level of the two protrusions 26, that is to say in the predetermined spatial region 17, each vertical rod 15 or the sliding portion 28 formed by the vertical rod 15 diverges from its vertical direction such that a space 18 which is taken up by the protrusions 26 of the cover device 24 in the non-use position of the child seat device 7 is formed on each vertical rod 15. The two spaces 18 are located between the rods 15 and thus in the third spatial region as well as at least in part between the ends of the transverse rods 20 and thus also in the second spatial region. This is necessary since, when the child seat arrangement is folded out of the use position, in which the cover device 24 bears on the seat device 23, into the non-use position, the protrusions 26 enter the second spatial region. Therefore, it is crucial that the sliding portions 28 or, here, the rods 15 do not take up the second and the third spatial region there, i.e. in the spaces 18 taken up by the protrusions 26 in the non-use position.

For this, as is the case in the drawing and according to a first embodiment, viewed in the longitudinal direction of the shopping cart 1, the rods 15 can deviate laterally while remaining in the third spatial region. A second equivalent embodiment preferably uses the outermost left and right support rods 19 instead of the rods 15 as sliding device 28. According to this second embodiment, the support rods 19 used move out of the third spatial region, traversing the second spatial region, into the first spatial region, which is not taken up by the protrusions 26 in the non-use position. For this, they are optionally bent in an intermediate portion or are straight and are as a whole inclined with respect to the remaining support rods 19, which only take up the first spatial region. The inclined support rods 19 or the support rods 19 bent out of the third into the first spatial region form sliding portions 28 in such a manner that the protrusions slide along on the sliding portions 28 of the backrest 13 if it is necessary to move the child seat arrangement 7 out of the use position into the non-use position, or vice versa. The sliding portions 28 are arranged to both sides of a central portion 29 of the backrest 13 and the vertical support rods 19 thereof take up only the first spatial region and the horizontal transverse rods 20 thereof preferably only take up the second spatial region. Similarly, according to a third equivalent embodiment, sliding portions 28 arranged in the third and/or second spatial region may also end below the respective spaces 18 such that they do not take up the spaces 18 taken up by the protrusions 26 in the non-use position. While the first and second equivalent embodiments are used preferably in the case of a backrest 13 made from wire, the third equivalent embodiment is suitable preferably for a backrest 13 made from plastic.

In the embodiment illustrated in the drawing, the protrusions 26 do not bear against the two vertical rods 15 such that the protrusions 26, using the second spatial region, do not lie between the two vertical rods 15 and further vertical rods 11 belonging to the rear wall 9. In the case of the second equivalent embodiment, in the non-use position of the child seat device the protrusions 26 bear against the support rods 19 forming the sliding portions 28, since that respective portion of the support rods 19 against which the protrusions 26 bear takes up the first spatial region, while the protrusions 26 are located in the second spatial region. Since the vertical support rods 19 are placed on the transverse rods 20, a free space corresponding to the second spatial region is produced in the region of the vertical support rods 19 and, in the non-use position of the child seat arrangement 7, is used at least by the greater part of the remaining volume of the cover device 24, i.e. the central portion 29 thereof. Not only the two protrusions 26 but also the cover device 24 as a whole thus do not increase the thickness of the child seat arrangement 7 in the folded state. The solution according to the invention, as proposed in WO 2012/034556 A2, can thus also be implemented in the case of the child seat arrangement 7 equipped with a cover device 24 described here. Depending on the construction and design of the child seat arrangement 7, two vertical rods 11 arranged on the right and left of the rear wall 9 and located in relatively close, that is to say direct proximity, to the two vertical rods 15 of the backrest 13, can be shaped outward and back again in the same way, in order to likewise avoid the situation in which rods 11 and 15 increase the thickness of the child seat arrangement 7. The vertical rods 11 of the rear wall 9 then extend parallel to and at a small spacing from the vertical rods 15 of the backrest 13. The two design forms are each illustrated in one half of the drawing. On the right-hand side, that design form is shown in which the vertical rods 11 of the rear wall 9 are bent outwardly in opposite directions correspondingly with respect to the spaces 18 formed by the vertical rods 15 of the backrest 13 and taken up by the protrusions 26 in the non-use position. In both cases, the two spaces 18 taken up by the protrusions in the non-use position are in any case always present on the right and left of the backrest 13.

Common to all described equivalent embodiments is the fact that the cover device 24 has two oppositely outwardly directed protrusions 26, that the backrest 13 has a central portion 29 and two sliding portions 28 laterally adjoining the central portion 29 in such a manner that the protrusions 26 located between the rear wall 9 and the backrest 13 slide along on the sliding portions 28 of the backrest 13 if it is necessary to move the child seat arrangement 7 out of the use position into the non-use position, or vice versa, wherein the sliding portions 28 at least in part do not run parallel to the sides of the central portion 29 of the backrest 13 and/or are shorter in the vertical direction than the central portion 29, in such a manner that a space 18 which is taken up by the protrusions 26 in the non-use position of the child seat arrangement 7 is formed in each case.

Here, the use position denotes that arrangement in which the cover device 24 can be used as a seat base when it lies on the seat device 23 and the leg holes 10 in the rear wall 9 are not concealed by the cover device 24. The central portion 29 of the backrest is vertically delimited by the laterally outermost vertical rods 19 that only take up the first spatial region and is horizontally delimited by the transverse rods 20 connected to the support rods 19. Instead of the transverse rods 20 and support rods 19, the central portion 29 may be formed by a surface part which is produced when the intermediate spaces between the support rods 19 are at least partially closed, while the free space between the transverse rods 20 remains.

According to a first advantageous embodiment, the central portion 29 of the backrest 13 is formed by support rods 19 lying in one plane and separated by intermediate spaces, and each sliding portion 28 is respectively formed by at least one rod 15, 19 which entirely or partially does not lie in this plane. Optionally and as in the drawing, this rod may correspond to the rod 15 or to the outermost left and right support rods 19, which in contrast to the drawing no longer belong to the central portion 29 of the backrest when they leave the first spatial region.

According to a second advantageous embodiment, as a departure from the drawing, each sliding portion 28 is respectively formed by at least one rod 15, 19, the first end thereof lying closer to the central portion 29 of the backrest 13 than the second end thereof. This may be the case in particular if, as a departure from FIG. 1 and FIG. 2, instead of the rods 15, the outermost left and right support rods 19 serving as sliding portions 28 are bent away to the side.

According to a third advantageous embodiment, each sliding portion 28 is formed by at least one bent rod 15, which draws back from the central portion 29 in a predetermined region 17. This embodiment is illustrated by way of example in FIG. 1 and FIG. 2.

According to a fourth advantageous embodiment, vertical rods 11 of the rear wall 9 that are in direct proximity to those vertical rods of the backrest 13 which form sliding portions 28 extend parallel to them. This embodiment is illustrated on the left-hand side in FIG. 2.

According to a fifth advantageous embodiment, as a departure from the drawing, each sliding portion 28 is formed on the central portion 29 of the backrest 13. This embodiment is suitable in particular for a backrest 13 made from plastic. In the case of a backrest 13 of this type, the support rods 19 are preferably replaced by a surface and, instead of the transverse rods 20, there are ribs for reinforcing this surface. The rods 15 are then also replaced by ribs or reinforced portions.

According to a sixth preferred embodiment, a contact surface which is inclined with respect to the plane of the vertical support rods 19 is provided at the top end of at least one sliding portion 28 and/or at the bottom end of at least one protrusion (26). This is expedient in particular if the sliding portions 28 end below the spaces 18 taken up by the protrusions 26 in the non-use position. Using these inclined contact surfaces, the protrusions 26 can be raised out of the second spatial region, in which they are located in the non-use position, onto the sliding elements 28 when the child seat arrangement 7 is moved out of the non-use position into the use position. Without inclined contact surfaces of this type, bottom edges of the protrusions 26 and top edges of the sliding elements 28 would butt against one another and the parts would catch on one another.

Here, the term "shopping cart" includes all transport carts which are manually movable and suitable for purchasing goods and for transporting goods irrespective of the type of trading outlet concerned in which these carts are used.

The invention claimed is:

1. A shopping cart configured to be nested with identical carts, the shopping cart comprising:
 a basket defining an interior space for holding goods; and
 a foldable child seat arrangement configured to close a rearward open region of the basket, the foldable child seat arrangement being configured to be moved between an open position and a folded position, the foldable seat arrangement opening into the basket interior space in the open position,
 wherein the child seat arrangement has a rear wall equipped with two leg holes, a backrest mounted movably on the rear wall and a seat configured to receive a small child in the open position, the seat being configured to limit the pivoting range of the backrest,
 wherein the child seat arrangement is equipped with a cover which is arranged pivotably on the rear wall, rests on the seat and is configured to be pivoted between an upwardly pivoted position and a downwardly pivoted position, in the upwardly pivoted position, the cover is configured to close the leg holes and to form, together with the seat, the rear wall, and the backrest, a further device for depositing goods,
 wherein, when the child seat arrangement is in the folded position, the rear wall, the seat, and the cover are in close contact with one another, the seat hangs downward, and the cover is in the upwardly pivoted position,
 wherein the cover has two oppositely outwardly directed protrusions,
 wherein the backrest has a central portion and two sliding portions laterally adjoining the central portion,
 wherein the protrusions located between the rear wall and the backrest slide along on the sliding portions of the backrest when the child seat arrangement is moved from the open position to the folded position, or from the folded position to the open position,
 wherein at least a portion of the sliding portions do not run parallel to the sides of the central portion of the backrest and are shorter in the vertical direction than the central portion such that when the child seat arrangement is in the folded position, a space is formed which is taken up by the protrusions.

2. The shopping cart as claimed in claim 1, wherein the central portion of the backrest is formed with support rods lying in one plane and separated by intermediate spaces, and each sliding portion is respectively formed by at least one rod which entirely or partially does not lie in this plane.

3. The shopping cart as claimed in claim 1, wherein each sliding portion is formed by at least one rod, the first end thereof lying closer to the central portion of the backrest than the second end thereof.

4. The shopping cart as claimed in claim 1, wherein each sliding portion is formed by at least one bent rod which draws back from the central portion in a predetermined region.

5. The shopping cart as claimed in claim 1, wherein vertical rods of the rear wall that are in direct proximity to those vertical rods of the backrest which form sliding portions extend parallel to them.

6. The shopping cart as claimed in claim 1, wherein the sliding portions are formed on the central portion of the backrest.

7. The shopping cart as claimed in claim 1, wherein, in the case of sliding portions which end below the spaces taken up by the protrusions in the non-use position, a contact surface which is inclined with respect to the plane of the vertical support rods is provided at the top end of at least one sliding portion and at the bottom end of at least one protrusion.

* * * * *